United States Patent [19]

Narisawa et al.

[11] 4,434,257

[45] Feb. 28, 1984

[54] CEMENT COMPOSITION

[75] Inventors: Shizuo Narisawa; Yoshito Taira; Yuuji Yoshii, all of Ichihara; Tomizou Kondou, Kyoto, all of Japan

[73] Assignee: Sumitomo Chemical Company, Limited, Osaka, Japan

[21] Appl. No.: 420,616

[22] Filed: Sep. 21, 1982

[30] Foreign Application Priority Data

Sep. 22, 1981 [JP] Japan .................. 56-150080

[51] Int. Cl.$^3$ .................. C04B 7/02; C04B 7/35
[52] U.S. Cl. .................. 524/5; 106/90; 106/95
[58] Field of Search .................. 524/5; 106/90, 95

[56] References Cited

U.S. PATENT DOCUMENTS

| | | | |
|---|---|---|---|
| 2,576,955 | 12/1951 | Ludwig | 524/5 |
| 2,733,995 | 2/1956 | Robinson | 524/5 |
| 3,537,869 | 11/1970 | Proell | 106/95 |
| 3,936,311 | 2/1976 | Kirst et al. | 106/95 |
| 4,189,415 | 2/1980 | Eck et al. | 524/5 |

FOREIGN PATENT DOCUMENTS

| | | | |
|---|---|---|---|
| 44-17755 | 8/1969 | Japan | 106/95 |
| 47-33054 | 8/1972 | Japan . | |
| 55-121936 | 9/1980 | Japan | 106/95 |
| 56-9259 | 1/1981 | Japan | 524/5 |
| 1114324 | 5/1968 | United Kingdom . | |

*Primary Examiner*—Ronald W. Griffin
*Attorney, Agent, or Firm*—Birch, Stewart, Kolasch & Birch

[57] ABSTRACT

An improved cement composition having improved crack resistance, water resistance, and which comprises a mixture of a conventional cement composition with an ethylene-vinyl acetate copolymer emulsion containing 1 to 10 parts by weight of a polyvinyl alcohol and 0.1 to 10 parts by weight of a higher fatty acid ester of a polyvalent alcohol having an HLB of 10 or less per 100 parts by weight of the solid resin components of the emulsion.

8 Claims, No Drawings

CEMENT COMPOSITION

The present invention relates to an improved cement composition, more particularly, to a cement composition having improved crack resistance, water resistance, and so forth which comprises a cement composition in admixture with a specific ethylene-vinyl acetate copolymer emulsion.

It has already been known to improve the properties of cement compositions by admixing into a synthetic resin emulsion and such improved cement compositions have practically been used. For example, it is disclosed to incorporate an ethylene-vinyl acetate copolymer emulsion into a cement composition wherein polyoxyethylene nonylphenyl ether is used as an emulsifier (cf. Japanese Patent Publication No. 33054/1972); to incorporate an emulsion of a saturated monocarboxylic acid vinyl ester copolymer such as ethylene-vinyl acetate copolymer to a cement composition wherein polyvinyl alcohol is used as a protective colloid (cf. Japanese Patent Publication No. 19913/1980); to incorporate an ethylene-vinyl acetate-branched fatty acid vinyl ester copolymer emulsion to a cement composition wherein polyvinyl alcohol and polyoxyethylene octylphenyl ether as an emulsifier are used (cf. Japanese Patent Publication No. 25406/1977); to incorporate an ethylene-vinyl acetate copolymer emulsion to a cement composition wherein a hydroxyethyl cellulose having an ethylene oxide addition molar number of 1.5 to 2.5 is used as a protective colloid and polyoxyethylene nonylphenyl ether is used as an emulsifier (cf. Japanese Patent Publication No. 27370/1979); to incorporate an ethylene-vinyl acetate-vinyl chloride copolymer emulsion to a cement composition wherein polyvinyl alcohol or a combination of polyvinyl alcohol and a nonionic emulsifier are used (cf. Japanese Patent Publication No. 19913/1981 and Japanese Patent Laid Open Application No. 11937/1981); and to incorporate an ethylene-saturated monocarboxylic acid vinyl ester-methyl methacrylate copolymer emulsion to a cement composition wherein polyvinyl alcohol or a combination of polyvinyl alcohol and a nonionic emulsifier, for example polyoxyethylene nonylphenyl ether, is used (cf. Japanese Patent Publication No. 19914/1980), and a similar composition is also disclosed in Japanese Laid Open Application No. 85444/1980.

However, these cement compositions incorporated with synthetic resin emulsions are still insufficient in crack resistance, water resistance, and so forth.

It is also known that the improvement of cracking, water absorption or waterproofing properties of cement compositions is usually carried out by adding calcium chloride, paraffin, fatty acid metal salts, or the like to the cement compositions (cf. "Constructional Materials and Their Application, B, I" issued by Gijutsushoin in Japan). According to this method, however, there results the unfavorable lowering of physical strength of the cement, loss of durability, and further because of transfer of the additives to the surface region, upper coating can not be applied, or if applied, it is easily released.

Under these circumstances, the present inventors have intensively studied on improvement of the properties of such conventional cement compositions, and as a result, it has been found that the water resistance, and crack resistance of cement compositions can be improved by incorporating a specific ethylene-vinyl acetate copolymer emulsion to the cement composition.

An object of the present invention is to provide a cement composition having improved crack resistance, water resistance, and so forth. Another object of the invention is to provide an improvement in the properties, such as crack resistance, and water resistance, of cement compositions without deteriorating other properties thereof, by using a specific ethylene-vinyl acetate copolymer emulsion. These and other objects and advantages of the invention will be apparent to persons skilled in the art from the following description.

The present invention provides an improved cement composition which comprises a mixture of a conventional cement composition with an ethylene-vinyl acetate copolymer emulsion which contains 1 to 10 parts by weight of polyvinyl alcohol and 0.1 to 10 parts by weight of a higher fatty acid ester of a polyvalent alcohol having a HLB of 10 or less per 100 parts by weight of the solid resin components of the emulsion, the improved cement composition having very small water absorbability and excellent waterproofing or resistance and less occurrence of cracking.

When the cement composition of the present invention is used as a prime-coating cement mortar for buildings, or as a cement mortar for repairing, as in civil engineering, it shows excellent adhesion to the under coat, remarkable improvement in water resistance or less water absorption and further, no occurrence of cracking. Besides, when the cement composition is used as a prime-coating, the upper coating is easily applicable and there is good adhesion with no release or falling off of the upper coat occurring.

The ethylene-vinyl acetate copolymer emulsion used in the present invention is a copolymer emulsion which comprises 5 to 40% by weight of ethylene, 20 to 95% by weight of vinyl acetate, and 0 to 50% by weight of a fatty acid vinyl ester other than vinyl acetate and/or vinyl chloride and/or (meth)acrylic acid ester. The ethylene-vinyl acetate copolymer may also be copolymerized with another copolymerizable monomer having one or more functional groups in an amount of 0.1 to 10% by weight based on the weight of whole monomers.

The fatty acid vinyl ester other than vinyl acetate includes vinyl propionate, vinyl butyrate, vinyl pivalate, vinyl nonanate, vinyl versatate (e.g. Veoba®, manufactured by Shell Chemical), and the fatty acid ester moiety includes preferably a fatty acid having an alkyl moiety of 2 to 12 carbon atoms.

The (meth)acrylic acid ester used in the present invention includes (meth)acrylic acid esters of an alcohol having 1 to 12 carbon atoms, such as methyl (meth)acrylate, ethyl (meth)acrylate, n-propyl (meth)acrylate, n-butyl (meth)acrylate, isopropyl (meth)acrylate, isobutyl (meth)acrylate, t-butyl (meth)acrylate, 2-ethylhexyl (meth)acrylate, cyclohexyl (meth)acrylate, or the like.

Other monomers having a functional group are, for example, monomers having a carboxyl group such as acrylic acid, methacrylic acid, crotonic acid, maleic acid, and maleic acid monoester; monomers having an amido group such as acrylamide; monomers having a hydroxy group such as 2-hydroethyl acrylate, 2-hydroxyethyl methacrylate; monomers having a sulfonyl group such as vinylsulfonic acid, allylsulfonic acid; monomers having an N-methylol group such as N-methylolacrylamide; monomers having an N-alkoxymethyl group such as N-butoxymethylacrylamide; and monomers having an epoxy group such as methacrylic acid glycidyl ether.

The polyvinyl alcohol used in the present invention has preferably a saponification degree of 70 to 99% by mole and an average polymerization degree of 300 to 2,700. There may be used a modified polyvinyl alcohol which is prepared by modifying the above polyvinyl alcohol with a carboxylic acid, sulfonic acid or glyoxal. These polyvinyl alcohols are preferably used in an amount of 1 to 10 parts by weight, more preferably 1.5 to 8 parts by weight, to 100 parts by weight of the solid resin components of the ethylene-vinyl acetate copolymer emulsion. When the amount of the polyvinyl alcohol is less than 1 part by weight, there can not be obtained a stable emulsion, and on the other hand, when it is over 10 parts by weight, the product shows inferior water resistance.

The higher fatty acid ester of a polyvalent alcohol has an HLB of 10 or less, preferably 8 or less, more preferably 6 or less. When the ester has an HLB of more than 10, the desired improvement of properties of the product can not be achieved. The polyvalent alcohol includes ethylene glycol, propylene glycol, butanediol, pentanediol, glycerin, erythritol, pentaerythritol, arabitol, sorbitol, sorbitan, mannitol, mannitan, diethylene glycol, diglycerin, terglycerin, dipropylene glycol, 1,2,3-butanetriol, or the like. Mono-, di-, tri-, tetra- or penta-esters of these alcohols with a higher fatty acid are used. The higher fatty acid includes oleic acid, linolic acid, linolenic acid, capric acid, pelargonic acid, lauric acid, tridecanoic acid, myristic acid, pentadecanoic acid, palmitic acid, margaric acid, stearic acid, nonadecanoic acid, arachidonic acid, behenic acid, $\omega$-cyclohexylfatty acid, $\omega$-phenylfatty acids, $\omega$-cyclopentenylfatty acids, hydroxyfatty acids, abietic acid, tall oil fatty acid, or the like. A polyoxyethylene oxide adduct of the higher fatty acid ester of polyvalent alcohol may also be used when the HLB thereof is 10 or less.

Suitable examples of the fatty acid esters are sorbitan monooleate, sorbitan sesquioleate, sorbitan monostearate, sorbitan monopalmitate, sorbitan monolaurate, sorbitan trioleate, sorbitan tall oil fatty acid triester, sorbitan tall oil fatty acid monoester, sorbitan castor oil ester, stearic monoglyceride, lauric monoglyceride, oleic monoglyceride, polyglycerin laurate, polyglycerin stearate, pentaerythritol monostearate, and further higher fatty acid esters of polyethylene glycols having an HLB of 10 or less, such as polyethylene glycol dilaurate, polyethylene glycol distearate, polyethylene glycol dioleate, polyethylene glycol monostearate, polyethylene glycol monolaurate, and polyethylene glycol monooleate.

When the higher fatty acid ester of a polyvalent alcohol is used in an amount of less than 0.1 part by weight based on the solid resin components, the desired improvement of properties of the product can not be achieved, and on the other hand, when it is over 10 parts by weight, the stability of the emulsion is deteriorated and further the cement composition shows unfavorably inferior adhesion. Preferred amount of the fatty acid ester is in the range of 0.2 to 8 parts by weight, more preferably 0.3 to 6 parts by weight.

When usually used nonionic emulsifiers for conventional emulsion polymerization, such as polyxoyethylene nonylphenyl ether, polyoxyethylene alkyl ether or polyoxyethylene-polyoxypropylene block copolymer, which have a low HLB, are used in the present invention, the desired improvement can not be achieved, and further, even when conventional emulsifiers having a usual HLB level are used, the desired improvement is still not achieved. It is important and essential in the present invention to employ a higher fatty acid ester of a polyvalent alcohol having an HLB of 10 or less.

The ethylene-vinyl acetate copolymer emulsion can be prepared by a conventional process, for example, by emulsion-polymerizing ethylene, vinyl acetate and optionally another monomer in the presence of polyvinyl alcohol and a higher fatty acid ester of a polyvalent alcohol having an HLB of 10 or less in an aqueous medium in a usual manner, or by emulsion-polymerizing the above monomers in the presence of polyvinyl alcohol in a usual manner, followed by mixing the resulting emulsion with a higher fatty acid ester of a polyvalent alcohol having an HLB of 10 or less.

The emulsion thus obtained may be mixed with a caking resistant agent and then dried by spray drying as disclosed in Japanese Patent Publication Nos. 47382/1978 and 50971/1980. The powdery ethylene-vinyl acetate copolymer thus obtained can be converted into an emulsion by dispersing it in water when used, and hence, such a powdery copolymer can also be used in the present invention.

Besides, the ethylene-vinyl acetate copolymer emulsion may optionally be mixed with a freezing stabilizer (e.g. ethylene glycol, propylene glycol) and a coalescing agent (e.g. 2,2,4-trimethyl-1,3-pentanediol monoisobutyrate, ethylcarbitol, butylcarbitol, ethylcarbitol acetate, butylcarbitol acetate, ethyl cellosolve, butyl cellosolve).

The emulsion of the present invention can be admixed into a conventional cement composition in an appropriate amount. The amount is not critical and is dictated by the general utility. From an economical viewpoint, the amount of the emulsion is preferably in the range of 3 to 100 parts by weight (converted into the solid resin components of the emulsion) to 100 parts by weight of cement in the cement composition.

The present invention is illustrated by the following Examples and Reference Examples but should not be construed to be limited thereto. In Examples, "part" means "part by weight" unless specified otherwise.

EXAMPLES 1 TO 12 AND REFERENCE EXAMPLES 1 TO 7

Cement (100 parts), siliceous sand (degree 7) (100 parts), and Hi-metrose 90 SH 4000 (manufactured by Shinetsu Kagaku) (0.4 part) are uniformly mixed to give a cement mortar powder. The powder (100 parts) is uniformly mixed with an emulsion which prepared in Preparations as disclosed hereinafter and is previously regulated so as to have solid components of 45% by weight) (10 parts) and water (25 parts) to give a cement mortar composition.

Various cement mortar compositions prepared in the above manner were subjected to tests of water absorption, dry adhesion and cracking by the method as used for evaluation of cement filler by Japan Housing Corporation. The results are shown in Table 1.

As is clear from the data of Examples and Reference Examples, the cement compositions of the present invention showed less water absorption and higher adhesion with less occurrence of cracking.

It should be noted that other cement compositions than that used in Examples can also be used in the present invention.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

TABLE 1

| Example No. | Preparation No. for preparing emulsion | Amount of absorbed water (gr/49 cm$^2$) | Dry adhesion (kg/cm$^2$) | Cracking |
|---|---|---|---|---|
| Ex. 1 | Preparn. 1 | 0.78 | 19.4 | No |
| Ex. 2 | Preparn. 2 | 0.50 | 19.0 | No |
| Ex. 3 | Preparn. 3 | 0.12 | 18.4 | No |
| Ex. 4 | Preparn. 4 | 0.48 | 19.5 | No |
| Ex. 5 | Preparn. 5 | 0.68 | 19.7 | No |
| Ex. 6 | Preparn. 6 | 0.32 | 20.0 | No |
| Ex. 7 | Preparn. 7 | 0.24 | 18.5 | No |
| Ex. 8 | Preparn. 8 | 0.06 | 17.8 | No |
| Ex. 9 | Preparn. 9 | 0.41 | 20.2 | No |
| Ex. 10 | Preparn. 10 | 0.52 | 19.1 | No |
| Ex. 11 | Preparn. 11 | 0.48 | 21.5 | No |
| Ex. 12 | Preparn. 12 | 0.47 | 21.0 | No |
| Ref. Ex. 1 | Preparn. 13 | 1.80 | 16.8 | 2 mm |
| Ref. Ex. 2 | Preparn. 14 | 2.51 | 16.7 | 1 mm |
| Ref. Ex. 3 | Preparn. 15 | 1.20 | 18.2 | 1 mm |
| Ref. Ex. 4 | Preparn. 16 | 2.42 | 14.4 | 3 mm |
| Ref. Ex. 5 | Preparn. 17 | 1.96 | 17.2 | 2 mm |
| Ref. Ex. 6 | Preparn. 18 | 1.88 | 16.9 | 1 mm |
| Ref. Ex. 7 | Preparn. 19 | 0.30 | 9.8 | No |

The emulsions used in Examples 1 to 12 and Reference Examples 1 to 7 are prepared as follows.

Preparation of ethylene-vinyl acetate copolymer emulsion:

In the same manner as described in Japanese Patent Publication No. 34650/1977, Example 8 except that the ethylene pressure, temperature, emulsifier are modified as disclosed in the following Preparations, various ethylene-vinyl acetate emulsions are prepared.

PREPARATION 1

A mixture of a polyvinyl alcohol (saponification degree: 88% by mole, average polymerization degree: 500; PVA-205, manufactured by Kuraray Co.) and a polyvinyl alcohol (saponification degree: 88% by mole, average polymerization degree: 1,700; PVA-217, manufactured by Kuraray Co.) (mixed ratio: 3:1 by weight) (4.8 parts) and Span 85 (sorbitan trioleate, HLB: 1.8, manufactured by Kao Soap Co.) (0.5 part by weight) are added, and thereby, there is obtained an ethylene-vinyl acetate copolymer emulsion having contents of ethylene: 15% by weight, vinyl acetate: 85% by weight and solid components: 54.5% by weight and containing the above additives.

In this and other Preparations, the "part by weight" means a "part by weight" of the additives to 100 parts by weight of the solid resin components.

PREPARATION 2

In the same manner as described in Preparation 1 except that the addition amount of Span 85 is changed to 2.4 parts by weight, there is obtained an ethylene-vinyl acetate copolymer emulsion having contents of ethylene: 15.2% by weight, vinyl acetate: 84.8% by weight and solid components: 55.2% by weight and containing the additives.

PREPARATION 3

In the same manner as described in Preparation 1 except that the addition amount of Span 85 is changed to 5.4 parts by weight, there is obtained an ethylene-vinyl acetate copolymer emulsion having contents of ethylene: 14.8% by weight, vinyl acetate: 85.2% by weight and solid components: 54.8% by weight and containing the additives.

PREPARATION 4

In the same manner as described in Preparation 1 except that Atmos 300 (oleic monoglyceride, HLB: 2.8, manufactured by Kao Atlas Co.) (3.6 parts by weight) is used instead of Span 85, there is obtained an ethylene-vinyl acetate copolymer emulsion having contents of ethylene: 16% by weight, vinyl acetate: 84% by weight and solid components: 54.2% by weight and containing the additives.

PREPARATION 5

In the same manner as described in Preparation 1 except that Span 60 (sorbitan monostearate, HLB: 4.7, manufactured by Kao Atlas Co.) (3.6 parts by weight) is used instead of sorbitan trioleate, there is obtained an ethylene-vinyl acetate copolymer emulsion having contents of ethylene: 16% by weight, vinyl acetate: 84% by weight and solid components: 55.4% by weight and containing the above additives.

PREPARATION 6

In the same manner as described in Preparation 1 except that PVA-205 (5.8 parts by weight) is used as the polyvinyl alcohol and Span 80 (sorbitan monooleate, HLB: 4.3, manufactured by Kao Atlas Co.) (2.4 parts by weight) is used, there is obtained an ethylene-vinyl acetate copolymer emulsion having contents of ethylene: 32% by weight, vinyl acetate: 68% by weight and solid components: 49.8% by weight and containing the above additives.

PREPARATION 7

In a similar manner as in Preparation 1, there is obtained an ethylene-vinyl acetate copolymer emulsion having contents of ethylene: 18% by weight, vinyl acetate: 82% by weight and solid components: 55.0% by weight and containing a mixture of a polyvinyl alcohol (saponification degree: 96% by mole, average polymerization degree: 1,800; C-500, manufactured by Nippon Gosei Chemical Co.) and a polyvinyl alcohol (saponification degree: 88% by mole, average polymerization degree: 1,700; PVA-217E, manufactured by Kuraray Co.) (mixed ratio: 1:2 by weight) (3.8 parts by weight), and to the emulsion is added Span 80 in an amount of 4.8 parts by weight to 100 parts by weight of solid components of the emulsion to give the desired emulsion.

PREPARATION 8

In the same manner as described in Preparation 1, there is obtained an ethylene-vinyl acetate-Veoba terpolymer emulsion having contents of ethylene: 15% by weight, vinyl acetate: 55% by weight, Veoba: 30% by weight and solid components: 50.6% by weight and containing a polyvinyl alcohol mixture of PVA-205 and PVA-217 (4.8 parts by weight) and Emasole O-10R (sorbitan sesquioleate, HLB: 3.7, manufactured by Kao Atlas Co.) (5.4 parts by weight).

PREPARATION 9

In the same manner as described in Preparation 1, there is obtained an ethylene-vinyl acetate-butyl acrylate terpolymer emulsion having contents of ethylene: 15% by weight, vinyl acetate: 73% by weight, butyl acrylate: 12% by weight and solid components: 50.2% by weight and containing PVA-217 (5.5 parts by weight) (as polyvinyl alcohol) and Span 85 (2.6 parts by weight).

PREPARATION 10

In the same manner as described in Preparation 1, there is obtained an ethylene-vinyl acetate-vinyl chloride terpolymer emulsion having contents of ethylene: 20% by weight, vinyl acetate: 45% by weight, vinyl chloride: 35% by weight and solid components: 49% by weight and containing PVA-217 (4.8 parts by weight) (as polyvinyl alcohol) and Span 80 (5.4 parts by weight).

PREPARATION 11

In the same manner as described in Preparation 1, there is obtained an ethylene-vinyl acetate-vinyl chloride-methyl methacrylate tetrapolymer emulsion having contents of ethylene: 15% by weight, vinyl acetate: 42% by weight, vinyl chloride: 40% by weight, methyl methacrylate: 3% by weight and solid components: 50.1% by weight and containing PVA-217 (5.0 parts by weight) (as polyvinyl alcohol) and Span 85 (3.2 parts by weight).

PREPARATION 12

The emulsion as prepared in Preparation 18 as disclosed hereinafter is mixed with butylcarbitol acetate (3 parts by weight) (as a coalescing agent) to give the desired emulsion.

PREPARATION 13

The same ethylene-vinyl acetate copolymer emulsion as prepared in Preparation 7 is used without adding thereto Span 80.

PREPARATION 14

In the same manner as described in Preparation 1, there is obtained an ethylene-vinyl acetate copolymer emulsion having contents of ethylene: 15% by weight, vinyl acetate: 85% by weight and solid components: 54.0% by weight and containing PVA-205 (4.5 parts by weight) (as polyvinyl alcohol) and Emulgen 931 (polyoxyethylene nonylphenyl ether, HLB: 17.2, manufactured by Kao Atlas Co.) (1.4 part by weight).

PREPARATION 15

The same emulsion as prepared in Preparation 14 is mixed with Emasole 0-10R (3.0 parts by weight) per 100 parts by weight of solid components of the emulsion to give the desire emulsion.

PREPARATION 16

In the same manner as described in Preparation 1, there is obtained an ethylene-vinyl acetate emulsion having contents of ethylene: 25% by weight, vinyl acetate: 75% by weight and solid components: 55.2% by weight and containing Cellocize QP-4400H (hydroxyethyl cellulose) (1.2 part by weight), Emulgen 931 (1.4 part by weight) and Span 85 (5.4 parts by weight).

PREPARATION 17

In the same manner as described in Preparation 1, there is obtained an ethylene-vinyl acetate copolymer emulsion having contents of ethylene: 18% by weight, vinyl acetate: 82% by weight and solid components: 50.8% by weight and containing a polyvinyl alcohol mixture of PVA-205 and PVA-217 (4.8 parts by weight) and Nonipole 20 (polyoxyethylene nonylphenyl ether, HLB: 5.7, manufactured by Sanyo Kasei Co.) (1.4 part by weight).

PREPARATION 18

In the same manner as described in Preparation 1, there is obtained an ethylene-vinyl acetate copolymer emulsion having contents of ethylene: 10% by weight, vinyl acetate: 90% by weight and solid components: 54.5% by weight and containing a polyvinyl alcohol mixture of PVA-205 and PVA-217 (4.8 parts by weight) and Tween 85 (polyoxyethylene sorbitan trioleate, HLB: 11.0, manufactured by Kao Atlas Co.) (2.4 parts by weight).

PREPARATION 19

The same ethylene-vinyl acetate copolymer emulsion as prepared in Preparation 7 is mixed with Span 85 in an amount of 11.5 parts by weight per 100 parts by weight of solid components of the emulsion to give the desired emulsion.

What is claimed is:

1. An improved cement composition which comprises a mixture of a cement composition and an emulsifier comprising an ethylene-vinyl acetate copolymer emulsion containing 1 to 10 parts by weight of a polyvinyl alcohol and 0.1 to 10 parts by weight of a higher fatty acid ester of a polyvalent alcohol having an HLB of 10 or less per 100 parts by weight of of the solid resin components of said emulsion, said ethylene-vinyl acetate copolymer emulsion comprising a copolymer having 5 to 40% by weight of an ethylene content, 20 to 95% by weight of a vinyl acetate content and 0 to 50% by weight of a fatty acid vinyl ester other than vinyl acetate, vinyl chloride and a (meth)acrylic acid ester.

2. A cement composition according to claim 1, wherein said ethylene-vinyl acetate copolymer is further copolymerized with 0.1 to 10% by weight of another copolymerizable monomer having one or more functional groups.

3. A cement composition according to claim 1, wherein said polyvinyl alcohol has a saponification degree of 70 to 99% by mole and an average polymerization degree of 300 to 2,700.

4. A cement composition according to claim 1, wherein said polyvinyl alcohol is contained in an amount of 1.5 to 8 parts by weight per 100 parts by weight of the solid resin components of the emulsion.

5. A cement composition according to claim 1, wherein said higher fatty acid ester of a polyvalent alcohol is selected from at least one member of the group consisting of mono-, di-, tri-, tetra- and penta-esters of an alcohol selected from ethylene glycol, propylene glycol, butanediol, petanediol, glycerin, erythritol, pentaerythritol, arabitol, sorbitol, sorbitan, mannitol, mannitan, diethylene glycol, diglycerin, terglycerin, dipropylene glycol, and 1, 2, 3-butanetriol.

6. A cement composition according to claim 1, wherein said higher fatty acid ester of a polyvalent alcohol has an HLB of 8 or less.

7. A cement composition according to claim 1, wherein said higher fatty acid ester of a polyvalent alcohol is contained in an amount of 0.2 to 8 parts by weight per 100 parts by weight of the solid resin components of said emulsion.

8. A cement composition according to claim 1, wherein said ethylene-vinyl acetate copolymer emulsion is incorporated into said composition in an amount of 3 to 100 parts by weight expressed in terms of the solid resin components per 100 parts by weight of cement in said cement composition.

* * * * *